United States Patent [19]

Bunel et al.

[11] Patent Number: 4,588,621

[45] Date of Patent: May 13, 1986

[54] CONTAINER BODY OF THE COMPOSITE TYPE AND CONTAINER COMPRISING SAID BODY

[75] Inventors: Gérard Bunel, LeHavre; Jean-Paul Lévy, Sarrebourg; Christian Martinez, Harfleur, all of France

[73] Assignee: Compagnie Francaise de Raffinage, Paris, France

[21] Appl. No.: 673,760

[22] PCT Filed: Feb. 8, 1984

[86] PCT No.: PCT/FR84/00027

§ 371 Date: Oct. 10, 1984

§ 102(e) Date: Oct. 10, 1984

[30] Foreign Application Priority Data

Feb. 10, 1983 [FR] France .................. 83 02124

[51] Int. Cl.$^4$ .................................................. B65D 15/06
[52] U.S. Cl. .................................. 428/35; 428/344; 428/355; 428/461; 275/232
[58] Field of Search ............... 428/35, 344, 355, 461; 215/232

[56] References Cited

U.S. PATENT DOCUMENTS

| | | | |
|---|---|---|---|
| 3,580,464 | 5/1971 | Griffith | 229/5.6 |
| 4,250,227 | 2/1981 | Claude et al. | 428/461 |
| 4,382,127 | 5/1983 | Claude et al. | 524/504 |
| 4,398,644 | 8/1983 | Claude et al. | 215/232 |
| 4,451,526 | 5/1984 | Claude et al. | 428/216 |

FOREIGN PATENT DOCUMENTS

| | | |
|---|---|---|
| 2507539 | 1/1984 | France . |
| 1294863 | 11/1972 | United Kingdom . |
| 1517932 | 7/1978 | United Kingdom . |

*Primary Examiner*—John E. Kittle
*Assistant Examiner*—James J. Seidleck
*Attorney, Agent, or Firm*—Curtis, Morris & Safford

[57] ABSTRACT

The invention relates to a composite container body wherein the inner surface, and optionally the outer surface and/or the edges, of said body are covered with a multi-layer complex comprising a metallic film to which is adhered a layer of an adhesive such as at least one copolymer obtained by polymerization of a monoolefin and grafting with a monoethylenic carboxylic acid, optionally in admixture with a second compound selected, for example, from the group consisting of low-density polyethylene, high-density polyethylene, polypropylene, polyisobutylene, polystyrene, polyesters, copolymers of ethylene and acrylic acid, and paraffins and waxes derived from the refining of crude petroleum.

20 Claims, 3 Drawing Figures

CONTAINER BODY OF THE COMPOSITE TYPE AND CONTAINER COMPRISING SAID BODY

The present invention relates to containers of the so-called composite type, that is to say, containers in which the bottom and/or top which is or are intended to provide a tight closure for the body of the container are made of a material different from that of the body. It relates, more particularly, to containers of this type whose body is internally provided with a polymer to which the bottom and/or top adhere.

Such composite containers are widely used in industry for the packaging of food products, for example.

The body of these containers, which may be of any shape whatever, usually comprises a foundation structure of single- or multi-ply paperboard which is covered on the inside with a multi-layer complex comprising, for example, a sheet of paper and/or a metallic film, a coat of glue and a film of a polymer such as high-density polyethylene, polypropylene, polyvinyl chloride, etc. The body of the container usually further comprises an outer covering in the form of an external layer adhering to the paperboard and capable of being decorated. This layer may consist of paper or of a paper-metal complex that is provided on its outside with a protective layer (a polymer coating or film).

The bottom and top are usually made of a metal such as aluminum or tinplate or of a composite material comprising a metallic layer facing the interior of the container. The metal surface may be treated or covered with protective products such as an epoxy coating.

The body of the container and its bottom, and after the composite container has been filled also its top, are usually joined to one another by crimping, glueing and/or welding.

The methods of fabricating the various parts of these containers are well known in the art, and both the bodies and the bottoms and tops generally have excellent technical characteristics, and in particular satisfactory corrosion resistance when the packaged products are not aggressive and the packaging conditions (temperature and pressure) are not too severe.

On the other hand, when these containers, after having been filled and hermetically sealed, are subjected to severe heat treatments, for example, to pasteurize or sterilize the packaged product, it is found that it is extremely difficult to maintain a satisfactory joint between body, bottom and top.

To overcome this drawback, it has already been proposed to coat the metal surface of the bottom and top with a polymer capable of being adhered, at the edges of the body of the container, to the polymer forming its inner layer.

However, this approach requires that the surfaces of the bottom and/or top be coated with a polymer, which adds to the cost of the container.

The present invention seeks to overcome this drawback by providing a composite container in which the bottom and the top will provide a tight, lasting closure for the body of the container even if the latter holds aggressive products or is subjected to severe pressure and temperature conditions, such as those prevailing in pasteurization or sterilization treatments.

To this end, the invention has as an embodiment a composite container body which is characterized in that the inner surface of the body, and optionally its outer surface and/or its edges, are covered with a multi-layer complex comprising a metallic film to which is adhered a layer of an adhesive such as at least one copolymer obtained by polymerization of a monoolefin and grafting with a monoethylenic carboxylic acid, optionally in admixture with a second compound selected, for example, from the group consisting of low-density polyethylene, high-density polyethylene, polypropylene, polyisobutylene, polystyrene, polyesters, copolymers of ethylene and acrylic acid, and paraffins and waxes derived from the refining of crude petroleum.

The invention further has as an embodiment a composite container comprising a body and a bottom and/or a top which are in direct contact with said body through a metallic portion, said container being characterized in that said body is of the type defined above and that said complex with which the inner surface of said body and optionally its outer surface and/or its edges are covered adheres by its adhesive layer to said metallic portion.

Multi-layer complexes of this type are well known in the art (see French Pat. Nos. 1,255,947 and 1,594,448), and the applicants and their co-workers have described their production and their use in the fabrication of caps for plastic bottles in detail, particularly in published French patent application Nos. 2,386,402, 2,442,261, 2,470,002, 2,489,827 and 2,507,539 and U.S. Pat. No. 4,451,526 issued May 29, 1984.

The monoolefin which is polymerized to obtain the copolymer forming said layer or entering into its composition may be ethylene or propylene, for example, and the monoethylenic carboxylic acid which is grafted onto the polyolefin so obtained is, in particular, acrylic or methacrylic acid.

Among the compounds which may be present in the layer of the complex, along with the copolymer, are paraffins and waxes. Paraffins are known to be mixtures of saturated hydrocarbons which have a crystalline structure and a melting temperature ranging from 35° to 66° C. The major portion of the paraffin consists of linear saturated aliphatic hydrocarbons. The oil content generally is less than 5 weight percent, and preferably less than 1 percent. Waxes are mixtures of saturated hydrocarbons which have higher molecular weights than paraffins. A wax has more cyclic and branched molecules and also a higher oil content than a paraffin; it is amorphous and its melting temperature ranges from 66° to 100° C.

As described in the patents and patent applications cited above, the multi-layer complexes suitable for use within the scope of the present invention may be prepared by coating a metallic film with a suspension of said copolymer, and optionally of said second compound, in an organic liquid and then eliminating the organic liquid.

When a film formed solely of the copolymer obtained by polymerization of a monoolefin and grafting with a monoethylenic carboxylic acid is used, the film may be glued or hot-calendered directly to the metal. Such a film may have a thickness ranging from about 10 to 100 microns. It may also be adhered to the metal by means of a mixture of an identical copolymer and of a second compound selected from the group consisting of low-density polyethylene, high-density polyethylene, polyisobutylene, polystyrene, copolymers of ethylene and acrylic acid, paraffins and waxes, the adhesive properties of such a mixture having been described by the applicants' co-workers in U.S. Pat. No. 4,451,526 cited above.

When the adhesive layer is produced from a suspension of a copolymer or of a mixture of said copolymer and a second compound, its thickness may be on the order of 3 to 20 microns.

In the two cases referred to above, the polymer layer of the multi-layer complex will adhere directly to the metallic surface of the bottom and top of the composite container, which can be accomplished by heat-sealing by the use of means known in the art (heating iron, high frequency, etc.) for bringing the polymer layer to its softening temperature while at the same time exerting slight pressure on the bottom and top as they make contact.

The metal of the bottom and top may be aluminum or tinplate, for example, which may be provided with a protective coating if desired. It should be noted that much like the body of the container, the bottom and top may be of a composite structure adapted to the nature of the product to be packaged and to the subsequent treatments (pasteurization, sterilization, etc.) which the filled and closed container is to undergo. Tests have shown that the joint between the body, bottom and top of the container withstands such treatments very well and provides an excellent seal even over a very long term. Moreover, since the adhesive layer covers the entire inner surface of the body of the container, a tight seal is secured even when the metallic film is formed by a spirally wound metal ribbon with a partial covering.

As in the prior art, the bottoms and tops may or may not be crimped onto the body of the container and the latter may comprise a foundation structure of paperboard provided on the outside with a label.

Embodiments of the invention are illustrated in the accompanying drawings, wherein.

Figure 1:
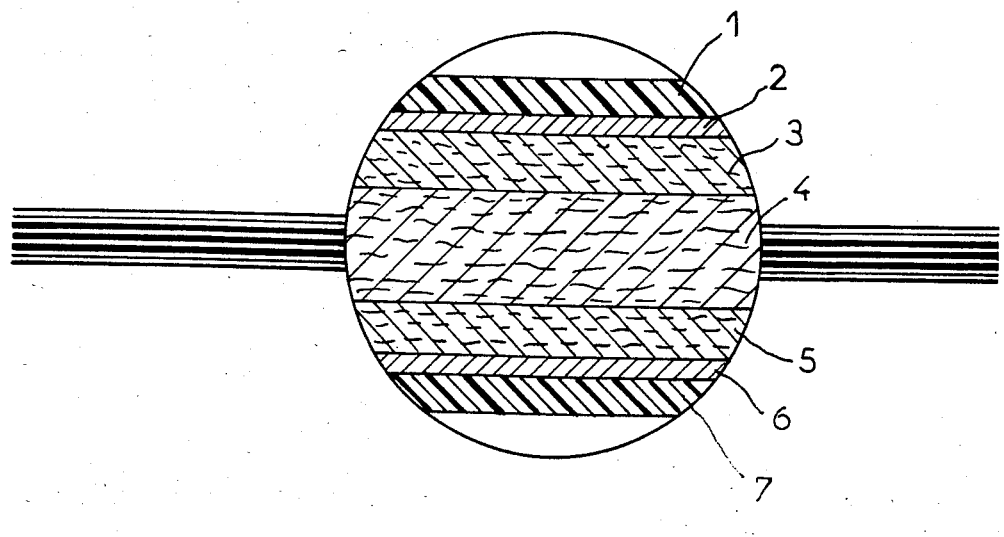
FIG. 1 is a sectional view of the composite container body (with an enlarged detail of a portion thereof)

The container body shown in section in FIG. 1 comprises a plurality of layers which adhere to one another. These are, from the inside toward the outside:

An inner layer 1 of a copolymer obtained by polymerization of a monoolefin, for example, ethylene, and grafting with a monoethylenic carboxylic acid, for example, acrylic acid, optionally in admixture with a second compound such as defined above, the thickness and exact nature of this layer being chosen on the basis of the end use and of the nature of the product packaged in the composite container;

an aluminum film 2 from 8 to 12 microns thick;

a sheet 3 of kraft paper with a weight per unit area of 40 g/m$^2$;

a combination 4 of from two to four layers of paperboard with a weight per unit area of 300 g/m$^2$;

a sheet 5 of kraft paper with a weight per unit area ranging from 40 to 60 g/m$^2$;

an aluminum film 6 from 8 to 9 microns thick; and an outer layer 7 of a varnish or of a strong film, or also of a copolymer of the same type as that of the inner layer 1, depending on the end use and on the method of joining the body of the container and its bottom or top. (See description below in connection with FIG. 3.)

The container body may thus comprise a metal-copolymer multi-layer complex both on its inner surface and on its outer surface. However, the structure just described is given merely by way of example and not of limitation.

Figure 2:
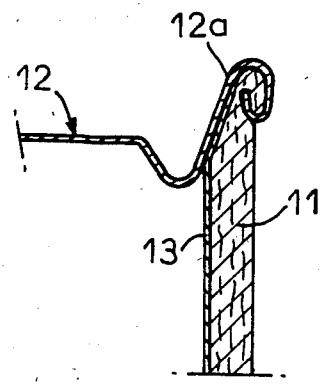
FIG. 2 is a detailed view on an enlarged scale showing one type of joint between the body of the container and its bottom or top.
Figure 3:
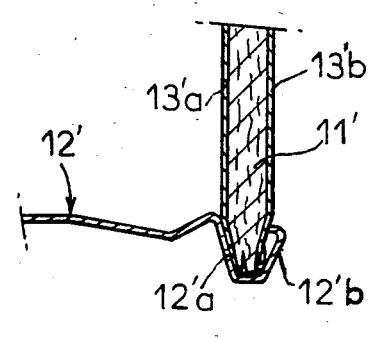
FIG. 3 is a view similar to FIG. 2 which illustrates another mode of joining the body of the container and its bottom or top.

This applies also to FIGS. 2 and 3, which illustrate a method of joining a container body 11 and 11', respectively, and a metal top or bottom 12 and 12', respectively, which are crimped to the container body.

In the case of FIG. 2, the container body 11 is provided only on its inner surface with a multi-layer complex whose outer layer 13 is formed of a copolymer obtained by polymerization of a monoolefin and grafting with a monoethylenic carboxylic acid, optionally in admixture with a second compound such as defined above. The outer layer 13 is adhered directly, by heat-sealing, for example, to the raised portion 12a which forms the rim of the top 12 that is crimped onto the body 11.

As in the case of FIG. 3, the body 11' comprises on both sides a multi-layer complex whose outer surface 13'a and 13'b, respectively, adheres much like surface 13 in FIG. 2 to two portions 12'a and 12'b, respectively, of the top, which are crimped onto the container body.

Other methods of joining the container body in accordance with the invention and the bottom and/or top may, of course, be used without departing from the scope of the invention.

We claim:

1. A composite container body having an inner surface and at least one opening, an outer surface and an edge between the inner and outer surface, which comprises a multi-layer complex on the inner surface containing a metallic film formed of a spirally wound metal ribbon and an adhesive layer which is adhered to the metallic film, covers the entire inner surface of the container body and is formed of at least one copolymer obtained by polymerization of a monoolefin and grafting with a monoethylenic carboxylic acid, the adhesive layer being adapted to adhere directly to a metallic surface of a closure for the opening such that a tight seal is formed between the container body and the closure.

2. A container body as recited in claim 1, wherein the multi-layer complex is on the inner surface and on the outer surface and/or the edge.

3. A container body as recited in claim 1, wherein the copolymer is in admixture with a compound selected from the group consisting of low-density polyethylene, high-density polyethylene, polypropylene, polyisobutylene, polystyrene, polyesters, copolymers of ethylene and acrylic acid, and a paraffin and a wax derived from the refining of crude petroleum.

4. A container body as recited in claim 1, wherein the monoolefin is selected from the group consisting of ethylene and propylene.

5. A container body as recited in claim 3, wherein the monoolefin is selected from the group consisting of ethylene and propylene.

6. A container body as recited in claim 1, wherein the monoethylenic carboxylic acid is selected from the group consisting of acrylic acid and methacrylic acid.

7. A container body as recited in claim 5, wherein the monoethylenic carboxylic acid is selected from the group consisting of acrylic acid and methacrylic acid.

8. A container body as recited in claim 1, wherein the grafted copolymer layer has a thickness of about 10 to 100 microns.

9. A container body as recited in claim 7, wherein the grafted copolymer layer has a thickness of about 10 to 100 microns.

10. A container body as recited in claim 1, wherein the grafted copolymer layer is adhered to the metallic film by means of a mixture of an identical copolymer and of a compound selected from the group consisting of low-density polyethylene, high-density polyethylene, polyisobutylene, polystyrene, copolymers of ethylene and acrylic acid, a paraffin and a wax.

11. A container body as recited in claim 9, wherein the grafted copolymer layer is adhered to the metallic film by means of a mixture of an identical copolymer and of a compound selected from the group consisting of low-density polyethylene, high-density polyethylene, polyisobutylene, polystyrene, copolymers of ethylene and acrylic acid, a paraffin and a wax.

12. A container body as recited in claim 1, wherein the adhesive layer has a thickness of about 3 to 20 microns.

13. A container body as recited in claim 3, wherein the adhesive layer has a thickness of about 3 to 20 microns.

14. A container body as recited in claim 1, wherein the metallic film is composed of a metal selected from the group consisting of aluminum and tinplate.

15. A container body as recited in claim 11, wherein the metallic film is composed of a metal selected from the group consisting of aluminum and tinplate.

16. A composite container comprising a body as recited in claim 1, and a closure with which through a metallic portion is in direct contact with said body, such that the multi-layer complex on the container body adheres by the adhesive layer to the metallic portion.

17. A composite container comprising a body as recited in claim 15, and a closure with which through a metallic portion is in direct contact with said body, such that the multi-layer complex on the container body adheres by the adhesive layer to the metallic portion.

18. A composite container as recited in claim 16, wherein the metallic portion of the closure is selected from the group consisting of aluminum and tinplate.

19. A composite container as recited in claim 18, wherein the closure is crimped onto the body.

20. A composite container as recited in claim 17, wherein said closure is secured onto said body by heat sealing said adhesive layer to the metallic portion of the closure.

* * * * *